L. W. GUSTAFSON.
LOCK FOR AUTOMOBILE HOODS.
APPLICATION FILED JAN. 10, 1917.
1,227,048.
Patented May 22, 1917.
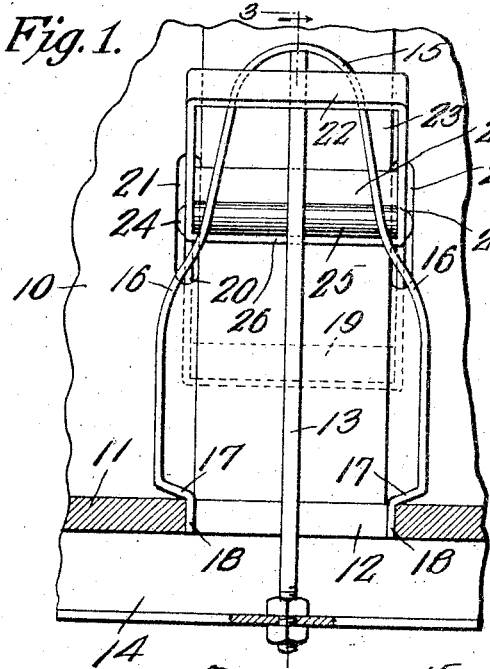
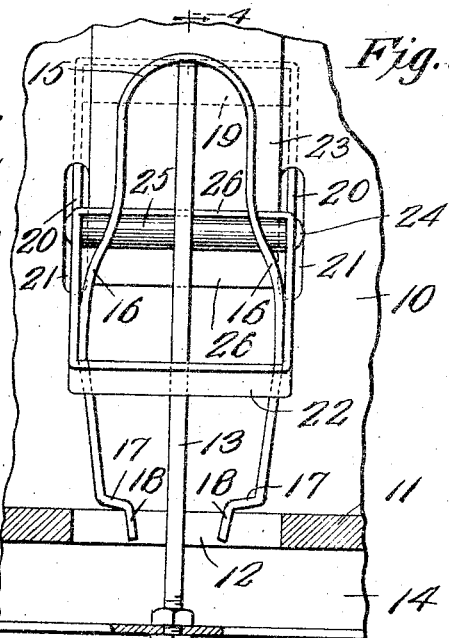
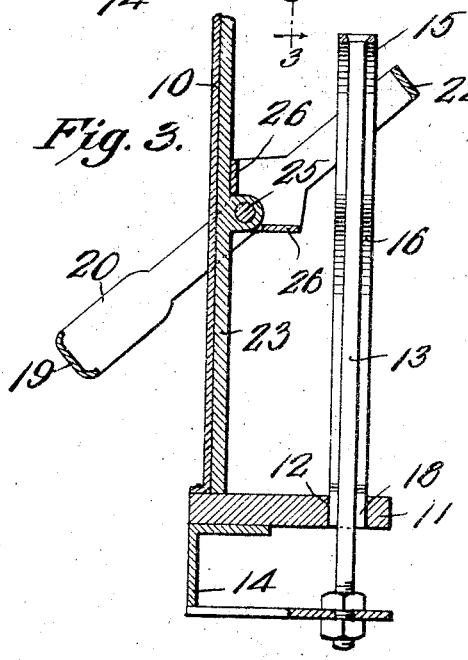
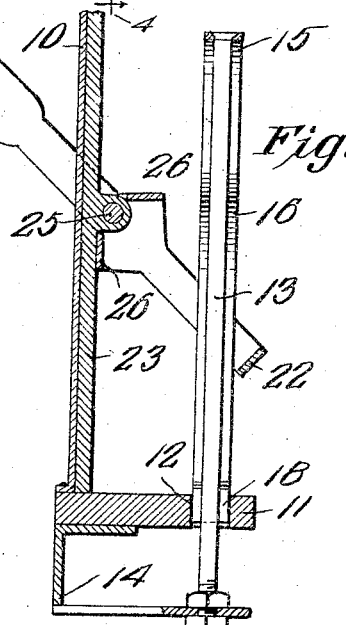
WITNESSES
James F. Crown,
Ross J. Woodward.
INVENTOR
Lawrence W. Gustafson,
BY Richard Owen,
ATTORNEY

UNITED STATES PATENT OFFICE.

LAWRENCE W. GUSTAFSON, OF SMOLAN, KANSAS.

LOCK FOR AUTOMOBILE-HOODS.

1,227,048.   Specification of Letters Patent.   Patented May 22, 1917.

Application filed January 10, 1917. Serial No. 141,660.

*To all whom it may concern:*

Be it known that I, LAWRENCE W. GUSTAFSON, a citizen of the United States, residing at Smolan, in the county of Saline and State of Kansas, have invented certain new and useful Improvements in Locks for Automobile-Hoods, of which the following is a specification.

This invention relates to an improved lock for an automobile hood and the principal object of the invention is to provide an improved lock for releasably holding the hood in a closed position, the actuating handle for releasing the lock providing a handle whereby the hood may be raised.

Another object of the invention is to so construct the lock that it will be moved to a releasing position when the handle is raised and will then return to a locking position when disengaging the handle, the spring arms forming the lock being so constructed that when the hood is lowered, the arms will be compressed thus permitting them to pass the openings formed in the side bars of the hood and return to a locking position thus releasably holding the hood closed until the handle is again raised to release the lock and raise the hood.

Another object of the invention is to so construct this lock that it cannot be released without the handle being raised thus preventing the lock from accidentally working loose.

Another object of the invention is to so construct the actuating handle that its movement will be limited thus preventing the spring arms from being compressed beyond a desired amount.

This invention is illustrated in the accompanying drawings, wherein:—

Figure 1 is a view showing the lock in elevation and in the locking position,

Fig. 2 is a view similar to Fig. 1 showing the lock moved to a releasing position, Fig. 3 is a sectional view taken along the line 3—3 of Fig. 1, and Fig. 4 is a sectional view taken along the line 4—4 of Fig. 2.

The automobile hood will be provided with a side wall 10 which may be raised for inspection of the engine and which carries at its lower edge, an inwardly extending strip or flange 11 provided with one or more openings 12 according to the number of fasteners to be provided, one being provided for each fastener. The rod or standard 13 of the fastener will be connected with the side bar 14 of the automobile frame and will extend through the opening 12 and support the U-shaped lock or latching member 15, this U-shaped lock being formed from a strip of resilient material having its side arms extending in diverging relation from the upper end of the standard 13 and being then curved outwardly as shown at 16 and bent to extend parallel with their free end portions bent inwardly to provide abutment shoulders 17 and then downwardly to provide fingers 18 which will extend into the opening 12 with the abutment shoulders 17 engaging the flange or strip 11. The actuating handle 19 is provided with arms 20 which extend through slots 21 in the side wall of the automobile hood and are connected at their inner ends by the cross bar 22 thus providing a yoke which when swung downwardly will engage the latch at the cam faces 16 and under pressure move the arms of the latch toward each other to the position shown in Fig. 2. When in this position, the side bars 20 of this handle will engage the parallel end portions of the latch arms and therefore the hood can be raised with the latch passing through the opening 12. After the latch has passed through the opening 12, the arms will return to the original position. This actuating handle 19 is pivotally connected with the reinforcing strip 23 by pin 24 which passes through the bearing 25 carried by the reinforcing strip and in order to prevent the handle from swinging upwardly or downwardly beyond the desired amount, there has been provided the abutment plates or bars 26 positioned to engage the reinforcing strip 23 and thus prevent the handle from moving beyond the position shown in Fig. 3 when lowered or beyond the position shown in Fig. 4 when raised. This will not only prevent the arms of the latch from being compressed beyond the desired amount when the hood is being raised but will further hold the handle in the position shown in Fig. 4 where it will be in the best position for use.

When in use, the device will be put in place as shown in the drawing and there will preferably be provided, two of the latches, each of which will be provided with its individual handle engaged by one hand when it is desired to raise the hood. When these handles are grasped, they will be swung upwardly and will compress the arms of the latches thus holding the abutment shoulders 17 out of the way and permitting the hood to be raised with the latches passing through the openings 12 formed in the flange 11. When lowering the hood, the upper portions of the latches will pass into the openings 12 and upon compressing the hood downwardly, the latches will be compressed until the hood is in place, the latches then returning to the operative position. When in the locking position, the handle will remain in the position shown in Fig. 3 and there will be no danger of the latches being released accidentally.

What is claimed is:—

1. A lock for an automobile hood having an inwardly extending base flange having a slot formed therein, comprising a standard, a locking element formed from a strip of resilient material bent to provide arms extending in spaced relation, the strip being connected intermediate its length with the upper portion of said standard, and having its arms extending in diverging relation upon the upper portion of the standard and being then bent outwardly to provide cam faces and having its end portions extended parallel and bent at their ends to provide inwardly extending abutment shoulders engaging the upper face of the base flange and fingers extending into the openings when in a locking position, and means carried by the hood for moving the arms of the locking element toward each other for permitting raising of the hood with the locking device passing through the opening of the flange.

2. A lock for an automobile hood having a base flange provided with an opening, said lock comprising a standard, a U-shaped latch carried by said standard and formed of resilient material having arms extending upon opposite sides of the standard and terminating in abutment shoulders engaging the upper face of the flange and fingers extending into the opening, and means carried by the hood for engaging the arms of the latch to move the arms toward said standard.

3. A lock for an automobile hood having a flange provided with an opening, said lock comprising a standard, latching arms extending from said standard and terminating in abutment shoulders engaging the flange and fingers extending into the opening formed in the flange, and a handle for raising the hood extending through slots formed therein and pivotally mounted and provided at its inner end portion with a yoke for engaging the latching arms to move the same to an inoperative position when the handle is raised.

4. A lock for an automobile hood having a flange provided with an opening, said lock comprising a standard extending through the opening, latching arms extending from the standard and engaging the flange and extending through the opening, a handle having arms extending through openings formed in the hood, a cross bar connecting the inner ends of said arms, a pivot pin engaging said arms within the hood to pivotally mount the handle, and means for limiting the swinging movement of the handle when moving the handle to bring the same into and out of engagement with the latching arms.

5. A lock for an automobile hood having a flange provided with a slot, said lock comprising a latching element including resilient engaging arms for engaging the flange and passing through openings thereof, and a handle for raising the hood having side arms extending through openings formed in the hood and pivotally mounted within the hood, the side arms being extended upon opposite sides of the latching element, and means for limiting swinging movement of the handle.

6. A lock for an automobile hood including a flange provided with an opening, said lock comprising a latching element including resilient arms for engaging the flange and passing through the opening thereof, and means for raising the hood including a yoke for engaging and moving the arms to an inoperative position when raising the hood.

7. A lock for an automobile hood comprising latching means for releasably holding the hood in a closed position, and a handle connected with the hood, for raising the hood and including means for engaging the latching means and moving the latching means to an inoperative position when the handle is moved to raise the hood.

8. An automobile hood, locking means for said hood positioned within the same, and means for raising the hood constituting actuating means for the locking means extending through said hood for engaging said locking means and moving the locking means to an inoperative position with the hood closed.

9. An automobile hood, locking means for said hood positioned within the same, and actuating means for said locking means extending through said hood for permitting said locking means to be moved to an inoperative position with the hood closed.

In testimony whereof I affix my signature in presence of two witnesses.

LAWRENCE W. GUSTAFSON.

Witnesses:
 ALEX HEDERSTEDT,
 JOSEPH A. BRANDT.